US011366222B2

(12) United States Patent
Laster

(10) Patent No.: US 11,366,222 B2
(45) Date of Patent: Jun. 21, 2022

(54) SONAR BEAM INDICATOR FOR A SONAR IMAGE

(71) Applicant: NAVICO HOLDING AS, Egersund (NO)

(72) Inventor: Matthew W. Laster, Broken Arrow, OK (US)

(73) Assignee: NAVICO HOLDING AS, Egersund (NO)

( * ) Notice: Subject to any disclaimer, the term of this patent is extended or adjusted under 35 U.S.C. 154(b) by 691 days.

(21) Appl. No.: 16/357,710

(22) Filed: Mar. 19, 2019

(65) Prior Publication Data

US 2020/0241133 A1    Jul. 30, 2020

Related U.S. Application Data

(63) Continuation of application No. 16/257,560, filed on Jan. 25, 2019.

(51) Int. Cl.
*G01S 15/46*    (2006.01)
*G01S 7/526*    (2006.01)
(Continued)

(52) U.S. Cl.
CPC .............. *G01S 15/46* (2013.01); *G01S 7/524* (2013.01); *G01S 7/526* (2013.01); *G01S 7/539* (2013.01);
(Continued)

(58) Field of Classification Search
None
See application file for complete search history.

(56) References Cited

U.S. PATENT DOCUMENTS 7,542,376 B1    6/2009  Thompson et al.
9,739,884 B2    8/2017  Proctor et al.
(Continued)

FOREIGN PATENT DOCUMENTS

WO    WO 2020/021936 A1    1/2020

OTHER PUBLICATIONS

CBS, How to Setup and Interpret Humminbird 360 Imaging https://www.youtube.com/watch?v=OvD3fv0_SOs (Year: 2018).*
(Continued)

*Primary Examiner* — Hovhannes Baghdasaryan
(74) *Attorney, Agent, or Firm* — Nelson Mullins Riley & Scarborough LLP

(57) ABSTRACT

A system for presenting sonar beam indicators on charts for noting the direction of the sonar beam is provided herein. The system includes one or more transducer elements and a bearing sensor configured to measure a bearing associated with the one or more transducer elements during receipt of the sonar returns. A marine electronics device is configured to receive sonar return data from the one or more transducer elements and generate sonar images based thereon. The marine electronics device further is configured to determine a watercraft location, receive a measured bearing, plot a watercraft indicator on a navigation chart, and cause a sonar beam indicator to be displayed in association with the watercraft indicator based on the measured bearing. The sonar beam indicator displays an indication of the direction in which the one or more transducer elements are facing when the sonar return data was received.

20 Claims, 12 Drawing Sheets

(51) Int. Cl.
  *G01S 15/89* (2006.01)
  *G01S 7/539* (2006.01)
  *G01S 7/524* (2006.01)
  *G01S 15/87* (2006.01)
  *G01S 7/62* (2006.01)

(52) U.S. Cl.
  CPC ........ *G01S 15/876* (2013.01); *G01S 15/8902* (2013.01); *G01S 7/6245* (2013.01)

(56) References Cited

U.S. PATENT DOCUMENTS

| | | |
|---|---|---|
| 9,829,321 B2 | 11/2017 | Steward et al. |
| 2009/0059005 A1* | 3/2009 | Hattori ............... G06K 9/00805 348/148 |
| 2018/0217234 A1 | 8/2018 | Skowronek |

OTHER PUBLICATIONS

U.S. Appl. No. 10/114,119 B2, filed Oct. 30, 2018, Horner et al.
U.S. Appl. No. 16/257,560, filed Jan. 25, 2019 entitled "Determining Distance in a Sonar Image".
"WASSP WMB-160F: Profiling a Shipwreck;" *YouTube*; Oct. 22, 2012; retrieved Mar. 18, 2021 from https://www.youtube.com/watch?v=bD1EmUaIm2A.

* cited by examiner

SONAR BEAM INDICATOR FOR A SONAR IMAGE

CROSS-REFERENCE TO RELATED APPLICATION

This application claims priority to and is a continuation of U.S. non-provisional patent application Ser. No. 16/257,560, entitled "Determining Distance in a Sonar Image," filed Jan. 25, 2019, which is incorporated by reference herein in its entirety.

FIELD OF THE INVENTION

Embodiments of the present invention relate generally to marine systems and, more particularly, to marine systems, assemblies, and associated methods for determining distance in a sonar image.

BACKGROUND OF THE INVENTION

Vessels (or watercrafts), such as fishing vessels, may include sonar systems that display an image of an underwater environment on a user interface. Additionally, vessels may also include a navigation system that displays a navigation chart, such as a nautical chart, on the same, or different, user interface. The navigation chart may, for example, include underwater features of a body of water and may also include a current position of a vessel based on a position sensor, such as a global positioning sensor (GPS).

BRIEF SUMMARY OF THE INVENTION

In some example embodiments, a sonar system and a navigation system may be configured to communicate. In such examples, a user may select an object, or point, in the sonar image and the navigation system may plot the selected location in the sonar image on the navigation chart. The plot location may, in some embodiments, be based on a distance to the selected point in the sonar return data.

In some example embodiments of the present invention, the sonar transducer assembly and/or the sonar signal, or beam, may be movable relative to the vessel. For example, the transducer assembly may be mounted to a trolling motor that can be steered to a desired direction, may be independently mounted and steerable, or may include transducer elements configured to transmit a sonar beam in a desired direction (e.g., mechanically steered, beam steered, etc.). The sonar system may be configured to determine the facing direction of the transducer assembly relative to the vessel, such that sonar return data is associated with a transducer bearing. Using the transducer bearings, a marine electronics device may be enabled to determine a distance between two selected points in sonar images. The marine electronics device may plot one or both of the selected points on the navigation chart and display a distance between the two points.

In some example embodiments, the marine electronics device may be configured to measure a bearing associated with the emitting face of a transducer assembly, e.g. a transducer bearing, and cause a sonar signal/beam indicator (e.g., a representation of the emitted sonar beam) to be displayed on the user interface, such as in the sonar display or navigation display. The sonar signal indicator may indicate the direction of the one or more sonar signals transmitted into the body of water by the transducer assembly. In an example embodiment, the measured bearing may be relative to the vessel and/or vessel bearing. For example, the sonar bearing may be based on a reference position of a steering position associated with the trolling motor or sonar transducer, or may be based on the mounting position of a sonar transducer that includes a steerable beam.

In some example embodiments, the vessel location may be determined based on position data from a GPS sensor. Additionally, a vessel bearing may be determined based on the position data, manometer measurement, gyroscope measurements, or the like. The marine electronics device may plot the position and orientation of the vessel on the navigation chart along with the sonar signal indicator relative to the vessel plot.

An example embodiment of the present invention includes a system for determining distance in a sonar image. The system comprises one or more transducer elements configured to transmit sonar signals into an underwater environment of a body of water and receive corresponding sonar returns from the underwater environment. The system further comprises a marine electronics device comprising a user interface, a processor, and a memory including computer program code. The computer program code is configured to, with the processor, cause the marine electronics device to receive first sonar returns from the one or more transducer elements at a first time and generate a first sonar image, based on the first sonar returns, of the underwater environment of the body of water. The computer program code is further configured to cause the marine electronics device to receive a first user input selection from the user interface indicating a first sonar position in the first sonar image; determine a first chart location on a navigation chart that corresponds to the first sonar position; receive second sonar returns from the one or more transducer elements at a second time, wherein the second time is different than the first time; generate a second sonar image, based on the second sonar returns, of the underwater environment of the body of water; receive a second user input selection from the user interface indicating a second sonar position in the second sonar image; determine a second chart location on the navigation chart that corresponds to the second sonar position; determine a distance between the first chart location and the second chart location; and cause the distance to be displayed on the user interface.

In some embodiments, the memory and computer program code are further configured to, with the processor, cause the marine electronics device to determine a first transducer bearing associated with the first sonar image that includes the first sonar position; and determine a second transducer bearing associated with the second sonar image that includes the second sonar position, wherein determining the distance between the first chart location and the second chart location is based on the first transducer bearing and the second transducer bearing. In some embodiments, the system further comprises a positioning sensor configured to measure a bearing associated with the one or more transducer elements during receipt of the first sonar returns or the second sonar returns. The first transducer bearing and the second transducer bearing are based on the measured bearing corresponding to a sonar return corresponding to the first sonar position or the second sonar position.

In some embodiments, the memory and computer program code are further configured to, with the processor, cause the marine electronics device to determine a distance between the watercraft and the first chart location or the second chart location based on a time of flight of a sonar signal and a sonar return associated with the first sonar position or the second sonar position.

In some embodiments, the memory and computer program code are further configured to, with the processor, cause the marine electronics device to cause a first indicator to be displayed on the navigation chart at the first chart location or the second chart location.

In some embodiments, the memory and computer program code are further configured to, with the processor, cause the marine electronics device to cause a first indicator to be displayed on the navigation chart at the first chart location and a second indicator to be displayed on the navigation chart at the second chart location. In some embodiments, the memory and computer program code are further configured to, with the processor, cause the marine electronics device to cause a line to be displayed between the first indicator and the second indicator. In some embodiments, the distance is displayed along the line between the first indicator and the second indicator.

In some embodiments, determining the first chart location or the second chart location on the navigation chart comprises determining a watercraft location based on position data from a position sensor; determining a distance between the watercraft and the first chart location or the second chart location based on a time of flight of a sonar signal and a sonar return associated with the first sonar position or the second sonar position; determining a transducer bearing associated with the first sonar image that includes the first sonar position or the second sonar image that includes the second sonar position; and calculating the first chart location or the second chart location based on the watercraft location, the distance between the watercraft and the first chart location or the second chart location, and the transducer bearing associated with the first sonar image or the second sonar image.

In some embodiments, determining the distance between the first chart location and the second chart location is performed dynamically in real time as the second user input moves about the user interface.

In another example embodiment, a method of determining distance in a sonar image is provided. The method comprises receiving first sonar returns and second sonar returns from one or more transducer elements, wherein the one or more transducer elements are configured to transmit sonar signals into an underwater environment of a body of water and receive corresponding sonar returns from the underwater environment. The method further comprises generating, by a processor associated with a marine electronics device, a first sonar image, based on the first sonar returns, of the underwater environment of the body of water. The method further comprises receiving a first user input selection, from a user interface of the marine electronics device, indicating a first sonar position in the first sonar image. The method further comprises determining, by the processor, a first chart location on a navigation chart that corresponds to the first sonar position; generating, by the processor, a second sonar image, based on the second sonar returns, of the underwater environment of the body of water; receiving a second user input selection from the user interface indicating a second sonar position in the second sonar image; determining, by the processor, a second chart location on the navigation chart that corresponds to the second sonar position; determining, by the processor, a distance between the first chart location and the second chart location; and causing the distance to be displayed on the user interface.

In some embodiments, the method further comprises determining a first transducer bearing associated with the first sonar image that includes the first sonar position and determining a second transducer bearing associated with the second sonar image that includes the second sonar position, wherein determining the distance between the first chart location and the second chart location is based on the first transducer bearing and the second transducer bearing. In some embodiments, the method further comprises receiving a measured bearing from a positioning sensor configured to measure a bearing associated with the one or more transducer elements during receipt of the first sonar returns or the second sonar returns, wherein the first transducer bearing and the second transducer bearing are based on the measured bearing corresponding to a sonar return corresponding to the first sonar position or the second sonar position.

In some embodiments, the method further comprises determining a distance between the watercraft and the first chart location or the second chart location based on a time of flight of a sonar signal and a sonar return associated with the first sonar position or the second sonar position.

In some embodiments, the method further comprises causing a first indicator to be displayed on the navigation chart at the first chart location or the second chart location.

In some embodiments, the method further comprises causing a first indicator to be displayed on the navigation chart at the first chart location and a second indicator to be displayed on the navigation chart at the second chart location. In some embodiments, the method further comprises causing a line to be displayed between the first indicator and the second indicator. In some embodiments, the distance is displayed along the line between the first indicator and the second indicator.

In some embodiments, determining the first chart location or the second chart location on the navigation chart comprises determining a watercraft location based on position data from a position sensor; determining a distance between the watercraft and the first chart location or the second chart location based on a time of flight of a sonar signal and a sonar return associated with the first sonar position or the second sonar position; determining a transducer bearing associated with the first sonar image that includes the first sonar position or the second sonar image that includes the second sonar position; and calculating the first chart location or the second chart location based on the watercraft location, the distance between the watercraft and the first chart location or the second chart location, and the transducer bearing associated with the first sonar image or the second sonar image.

In yet another example embodiment, a system for determining distance in a sonar image is provided. The system comprises one or more transducer elements configured to transmit sonar signals into an underwater environment of a body of water and receive corresponding sonar returns from the underwater environment. The system further comprises a marine electronics device, a user interface, a processor, and a memory including computer program code. The computer program code is configured to, with the processor, cause the marine electronics device to receive one or more sonar returns from the one or more transducer elements at a first time; generate one or more sonar images, based on the one or more sonar returns, of the underwater environment of the body of water; receive a first user input selection from the user interface indicating a first sonar position in the one or more sonar images; determine a first chart location on a navigation chart that corresponds to the first sonar position; receive a second user input selection from the user interface indicating a second sonar position in the one or more sonar images; determine a second chart location on the navigation chart that corresponds to the second sonar position; determine a distance between the first chart location and the second chart location; and cause the distance to be displayed on the user interface.

In another example embodiment, a system for displaying a marine chart is provided. The system comprises one or more transducer elements configured to transmit sonar signals into an underwater environment of a body of water and receive corresponding sonar returns from the underwater environment. The system further includes a bearing sensor configured to measure a bearing associated with the one or more transducer elements during receipt of the sonar returns. The system further includes a marine electronics device comprising a user interface, a processor, and a memory including computer program code. The computer program code is configured to, with the processor, cause the marine electronics device to receive sonar return data from the one or more transducer elements; generate one or more sonar images based on the sonar return data, wherein the one or more sonar images comprise a real time image of the underwater environment of the body of water; determine a watercraft location based on position data from a position sensor; receive a measured bearing from the bearing sensor associated with the sonar return data; plot a watercraft indicator on a navigation chart displayed on the user interface at the watercraft location; and cause a sonar beam indicator to be displayed in association with the watercraft indicator based on the measured bearing, wherein the sonar beam indicator displays an indication of the direction in which the one or more transducer elements are facing when the sonar return data was received by the one or more transducer elements.

In some embodiments, the sonar beam indicator comprises an icon corresponding to a sonar beam, wherein the icon includes an arc that corresponds to an effective horizontal beam coverage of the one or more transducer elements. In some embodiments, the computer program code is further configured to cause the processor to determine an effective distance of the sonar signals emitted from the one or more transducer elements based on an operating frequency of the one or more transducer elements and adjust a length of the sonar beam indicator extending from the watercraft indicator based on the determined effective distance of the sonar signals.

In some embodiments, the watercraft indicator indicates an orientation of the watercraft relative to the navigation chart.

In some embodiments, the computer program code is further configured to cause the processor to cause a second sonar beam indicator to be displayed overlaid on the one or more sonar images. In some embodiments, the second sonar beam indicator is displayed in association with a watercraft orientation reference based on the measured bearing, wherein the second sonar beam indicator displays the direction of the sonar signals transmitted into the body of water relative to the watercraft.

In some embodiments, the one or more sonar images are displayed in a first portion of the user interface and the navigation chart is displayed in a second portion of the user interface.

In some embodiments, the system further comprises a steering assembly configured to steer the one or more transducer elements in a plurality of directions.

In some embodiments, the system further comprises a trolling motor comprising a motor housing. The motor housing includes a motor configured to cause the trolling motor to propel a watercraft when the trolling motor is attached to the watercraft and the motor is submerged. The one or more transducer elements are mounted to the trolling motor. In some embodiments, the trolling motor further comprises a steering assembly configured to steer the trolling motor in a plurality of directions.

In yet another example embodiment, a system is provided. The system comprises one or more transducer elements configured to transmit sonar signals into an underwater environment of a body of water and receive corresponding sonar returns from the underwater environment, wherein the one or more transducer elements are configured to convert the sonar returns to sonar return data. The system further comprises a bearing sensor configured to measure a bearing associated with the one or more transducer elements during receipt of the sonar returns. The system further includes a marine electronics device comprising a user interface, a processor, and a memory including computer program code. The computer program code is configured to, with the processor, cause the marine electronics device to receive the sonar return data from the one or more transducer elements; generate one or more sonar images based on the sonar return data, wherein the one or more sonar images comprise a real time image of the underwater environment of the body of water; receive a measured bearing from the bearing sensor associated with the sonar return data; and cause a sonar beam indicator to be displayed in the one or more sonar image in association with a watercraft orientation reference based on the measured bearing, wherein the sonar beam indicator displays an indication of the direction in which the one or more transducer elements are facing when the plurality of sonar returns are received.

In some embodiments, the computer program code is further configured to cause the processor to determine a watercraft location based on position data from a position sensor; plot a watercraft indicator on a navigation chart displayed on the user interface at the watercraft location; and cause a second sonar beam indicator to be displayed in association with the watercraft indicator based on the measured bearing, wherein the second sonar beam indicator displays an indication of the direction in which the one or more transducer elements are facing when the sonar return data was received by the one or more transducer elements.

In yet another example embodiment, a system is provided. The system comprises a trolling motor comprising a motor housing that comprises a motor configured to cause the trolling motor to propel a watercraft when the trolling motor is attached to the watercraft and the motor is submerged. The system further comprises one or more transducer elements configured to transmit sonar signals into an underwater environment of a body of water and receive corresponding sonar returns from the underwater environment. The system further comprises a bearing sensor configured to measure a bearing associated with the one or more transducer elements during receipt of the one or more sonar returns. The system further comprises a marine electronics device comprising a user interface, a processor, and a memory including computer program code. The computer program code is configured to, with the processor, cause the marine electronics device to receive sonar return data from the one or more transducer elements; generate one or more sonar images based on the sonar return data, wherein the one or more sonar images comprise a real time image of the underwater environment of the body of water; determine a watercraft location based on position data from a position sensor; receive a measured bearing from the bearing sensor associated with the sonar return data; plot a watercraft indicator on a navigation chart displayed on the user interface at the watercraft location; and cause a sonar beam indicator to be displayed in association with the watercraft indicator based on the measured bearing, wherein the sonar beam indicator displays an indication of the direction in which the one or more transducer elements are facing when the sonar return data was received by the one or more transducer elements.

In some embodiments, the trolling motor further comprises a steering assembly configured to steer the trolling motor in a plurality of directions.

In some embodiments, the sonar beam indicator comprises an icon corresponding to a sonar beam, wherein the icon comprises an arc that corresponds to an effective horizontal beam coverage of the one or more transducer elements. In some embodiments, the computer program code is further configured to cause the processor to determine an effective distance of the sonar signals emitted from the one or more transducer elements based on an operating frequency of the one or more transducer elements and adjust a length of the sonar beam indicator extending from the watercraft indicator based on the determined effective distance of the sonar signals.

In some embodiments, the watercraft indicator indicates an orientation of the watercraft relative to the navigation chart.

In some embodiments, the computer program code is further configured to cause the processor to cause a second sonar beam indicator to be displayed overlaid on the one or more sonar images. In some embodiments, the second sonar beam indicator is displayed in association with a watercraft orientation reference based on the measured bearing, wherein the second sonar beam indicator indicates the direction of the sonar signals transmitted into the body of water relative to the watercraft.

In some embodiments, the plurality of sonar images are displayed in a first portion of the user interface and the navigation chart is displayed in a second portion of the user interface.

BRIEF DESCRIPTION OF THE DRAWINGS

Figure 1:
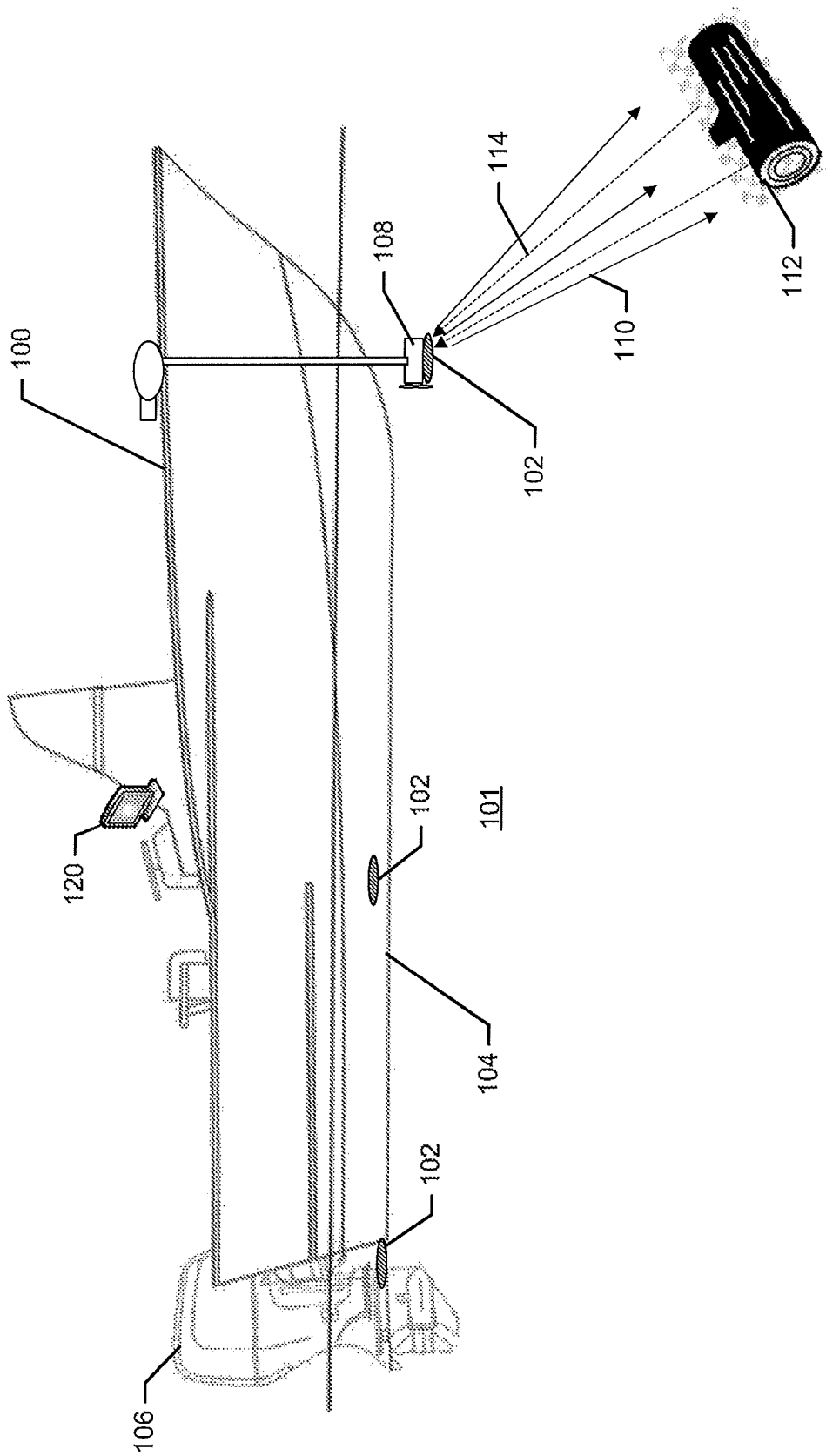
Figure 2A:
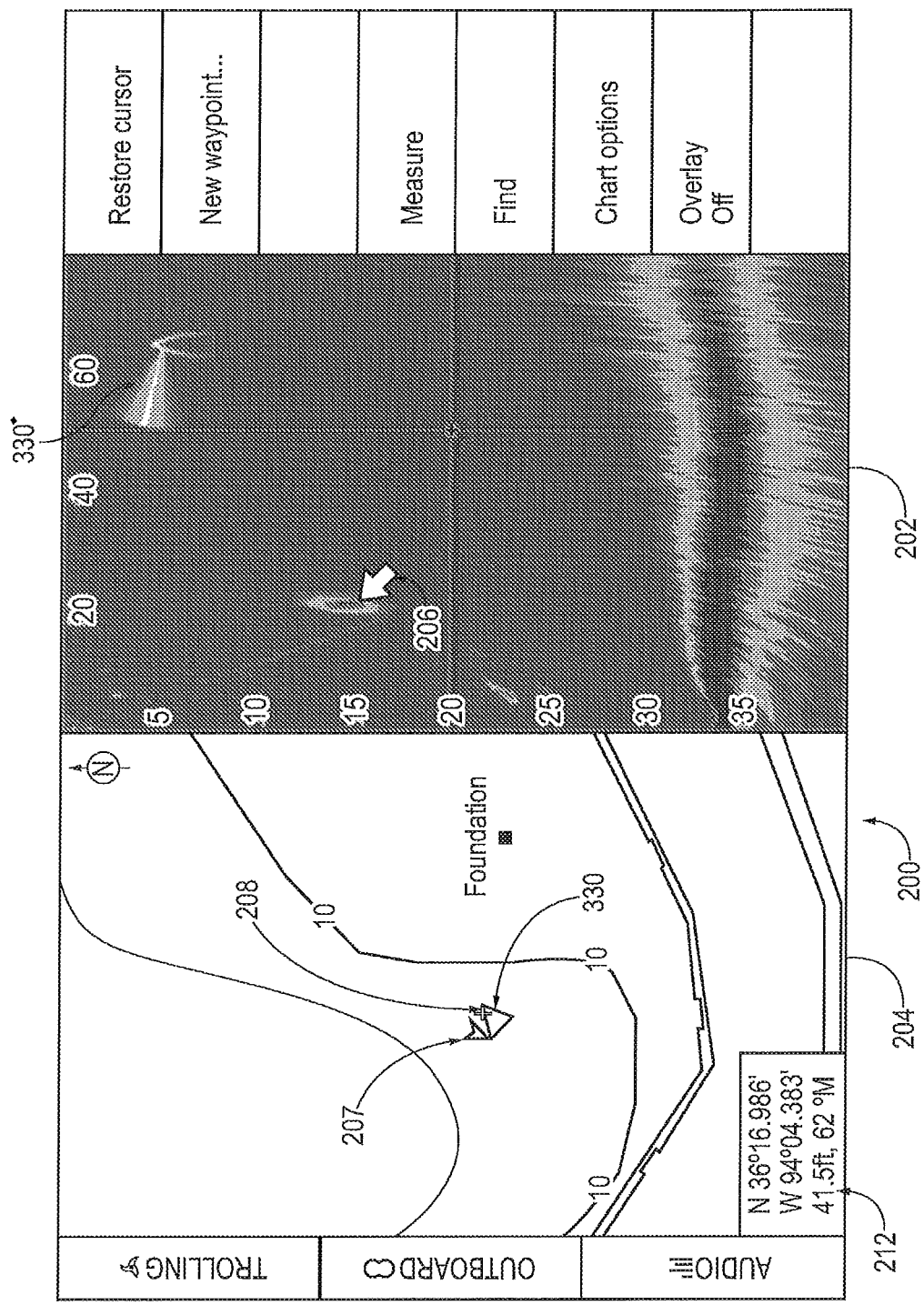
Figure 2B:
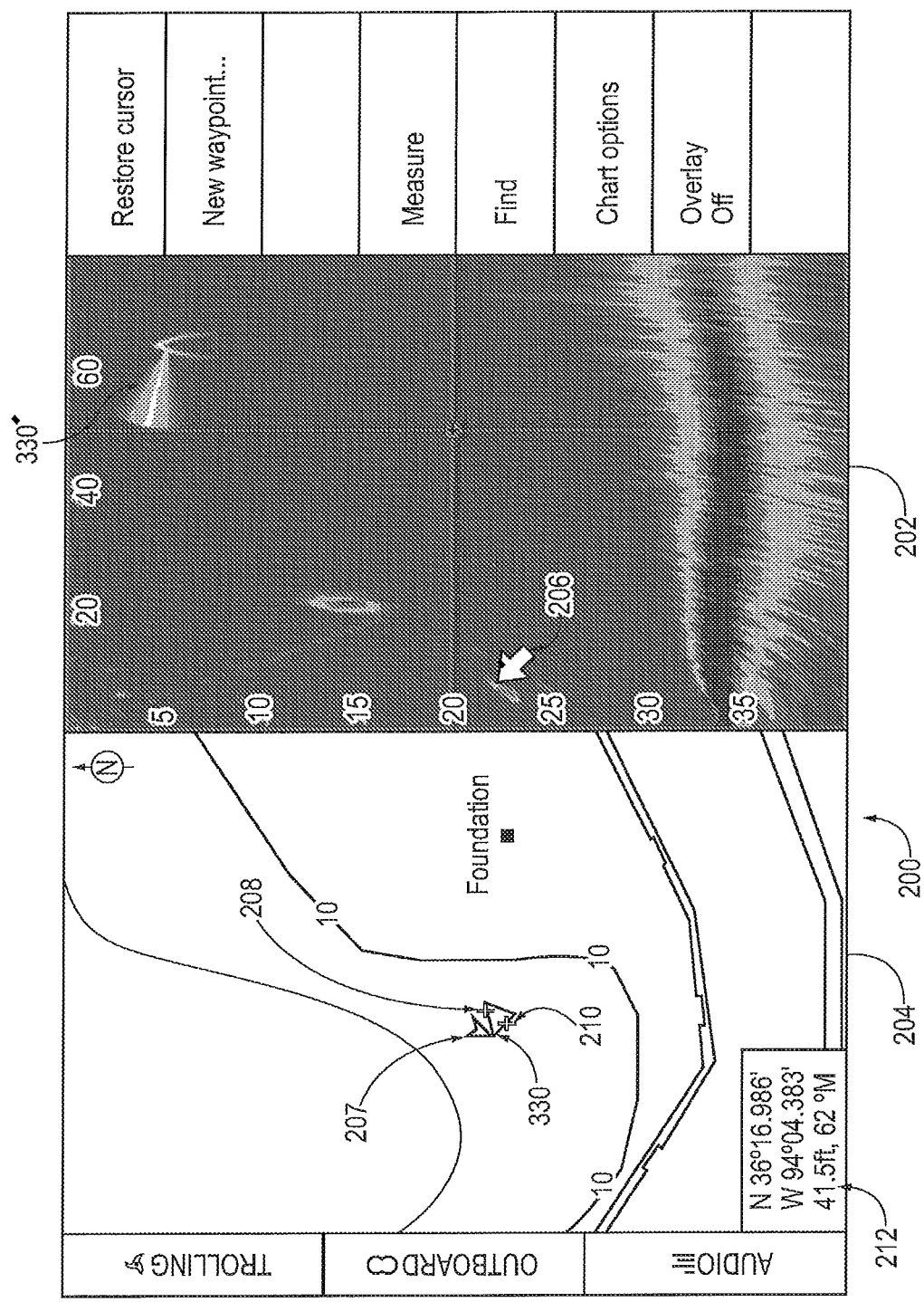
Figure 2C:
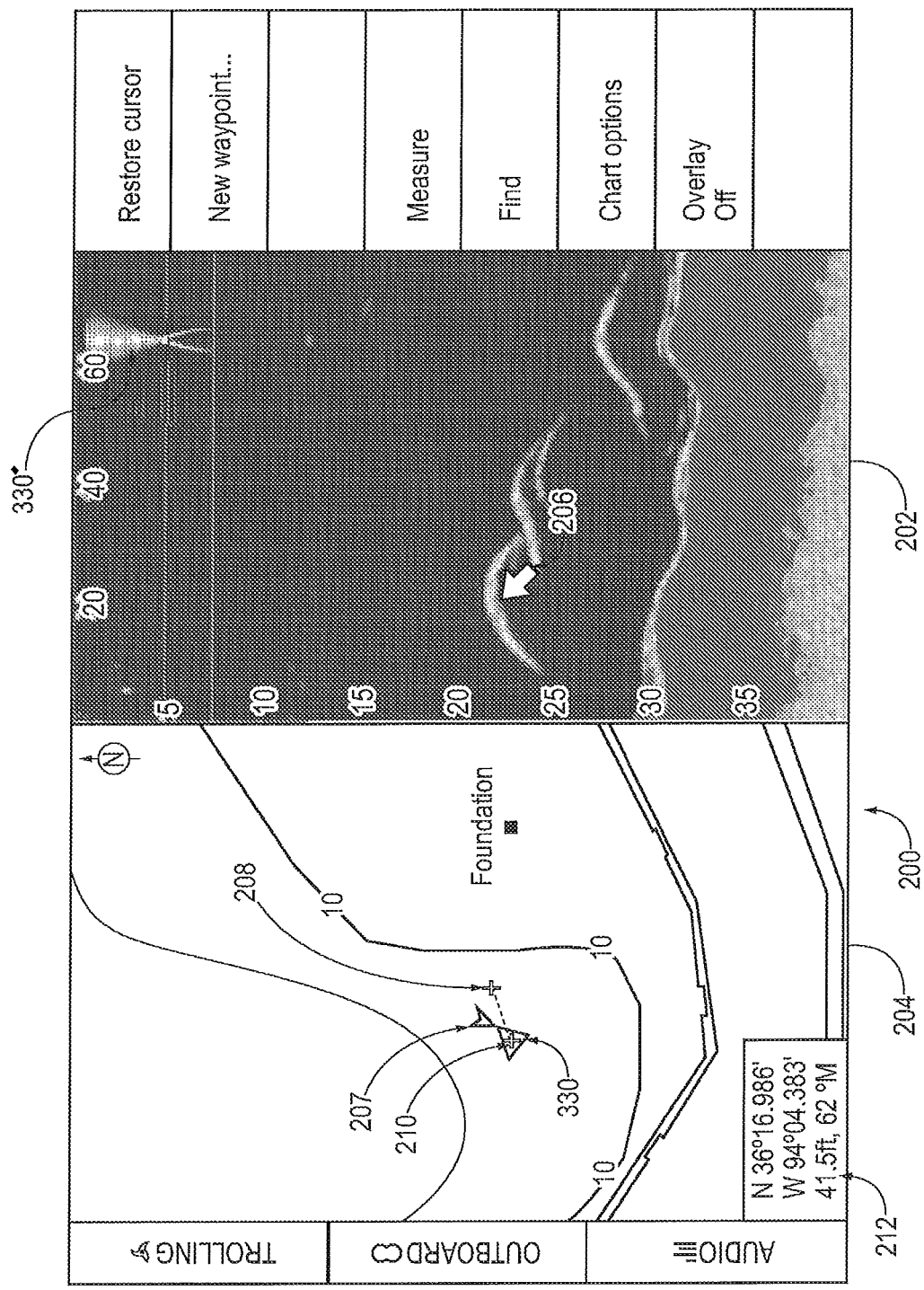
Figure 3:
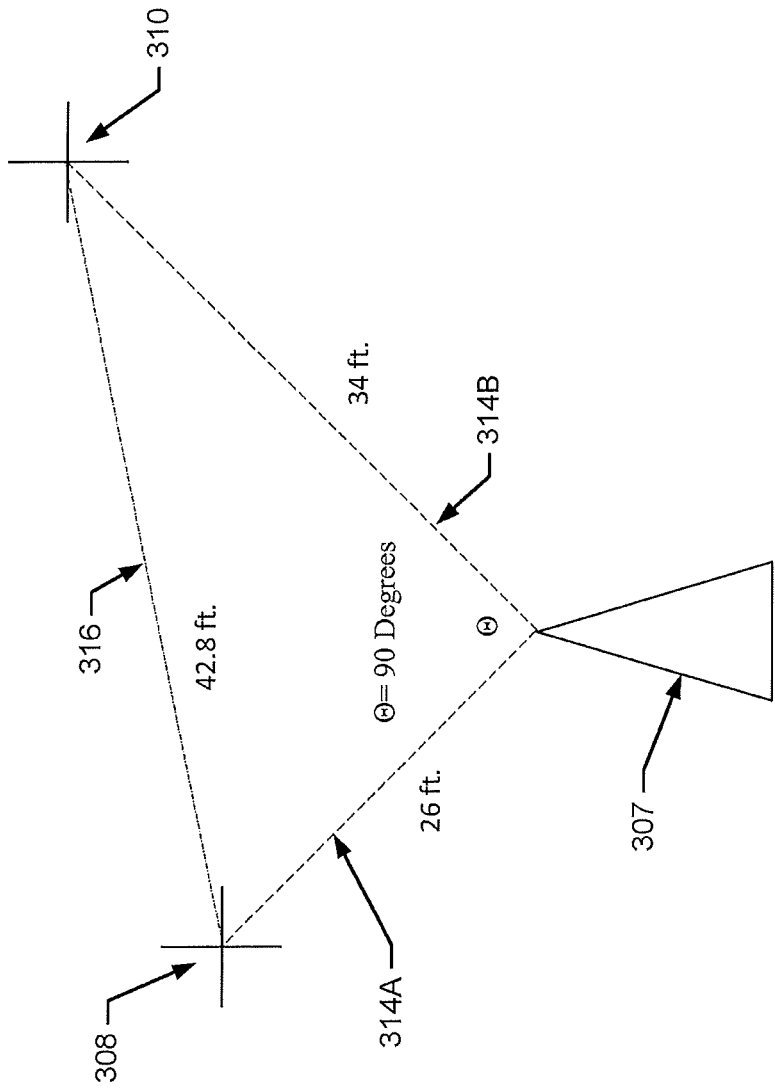
Figure 4:
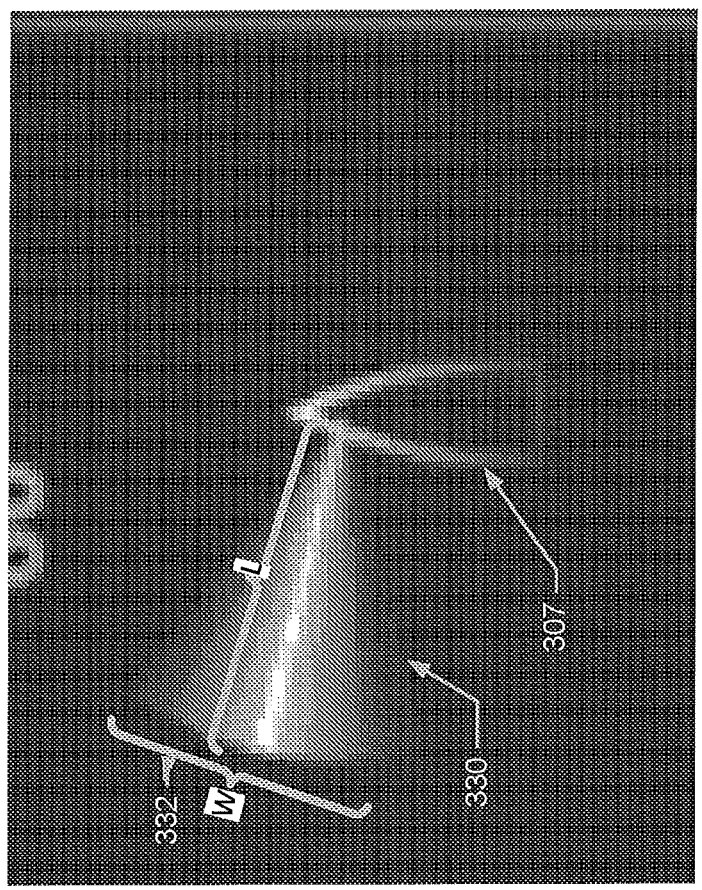
Figure 5:
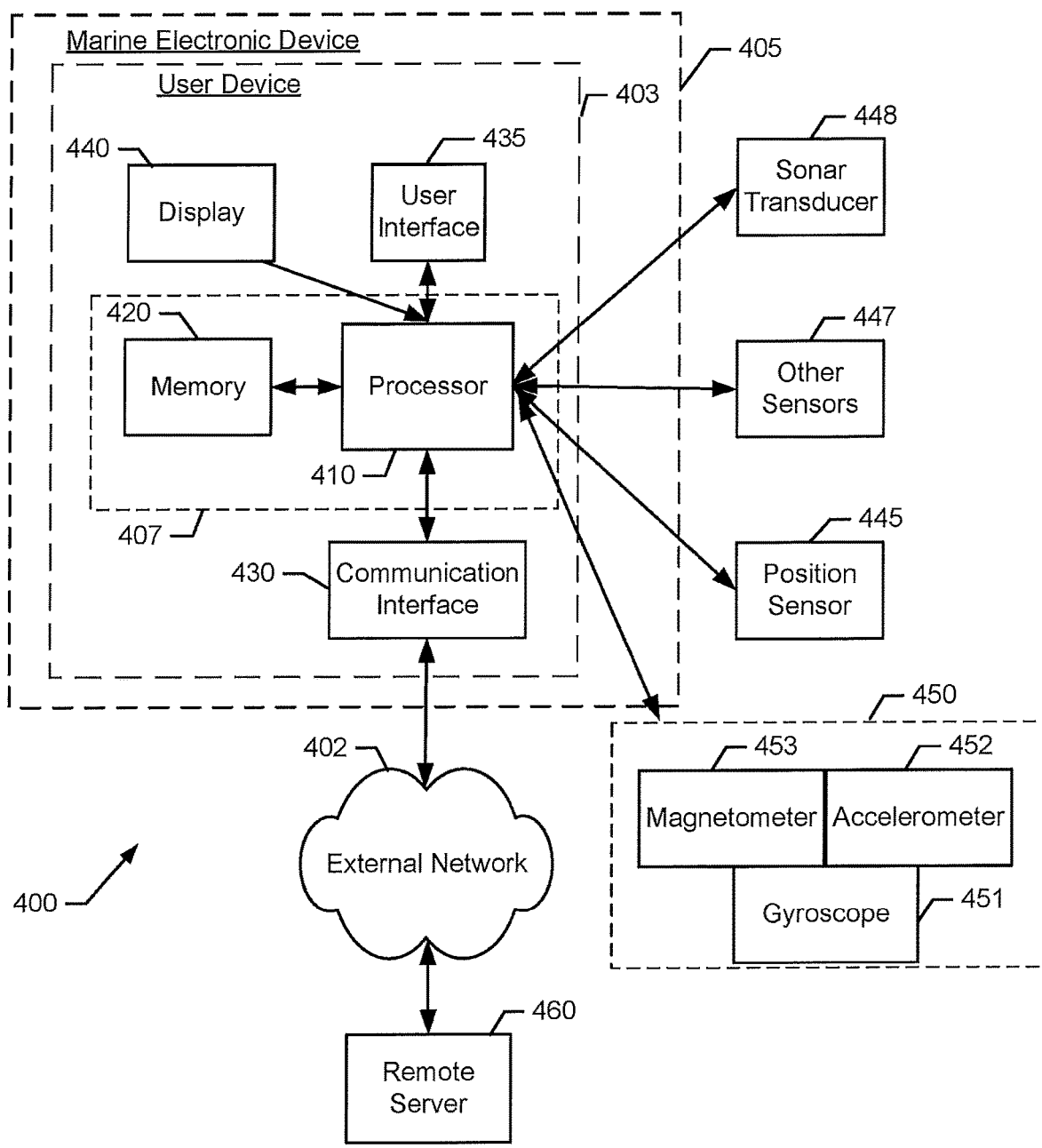
Figure 6:
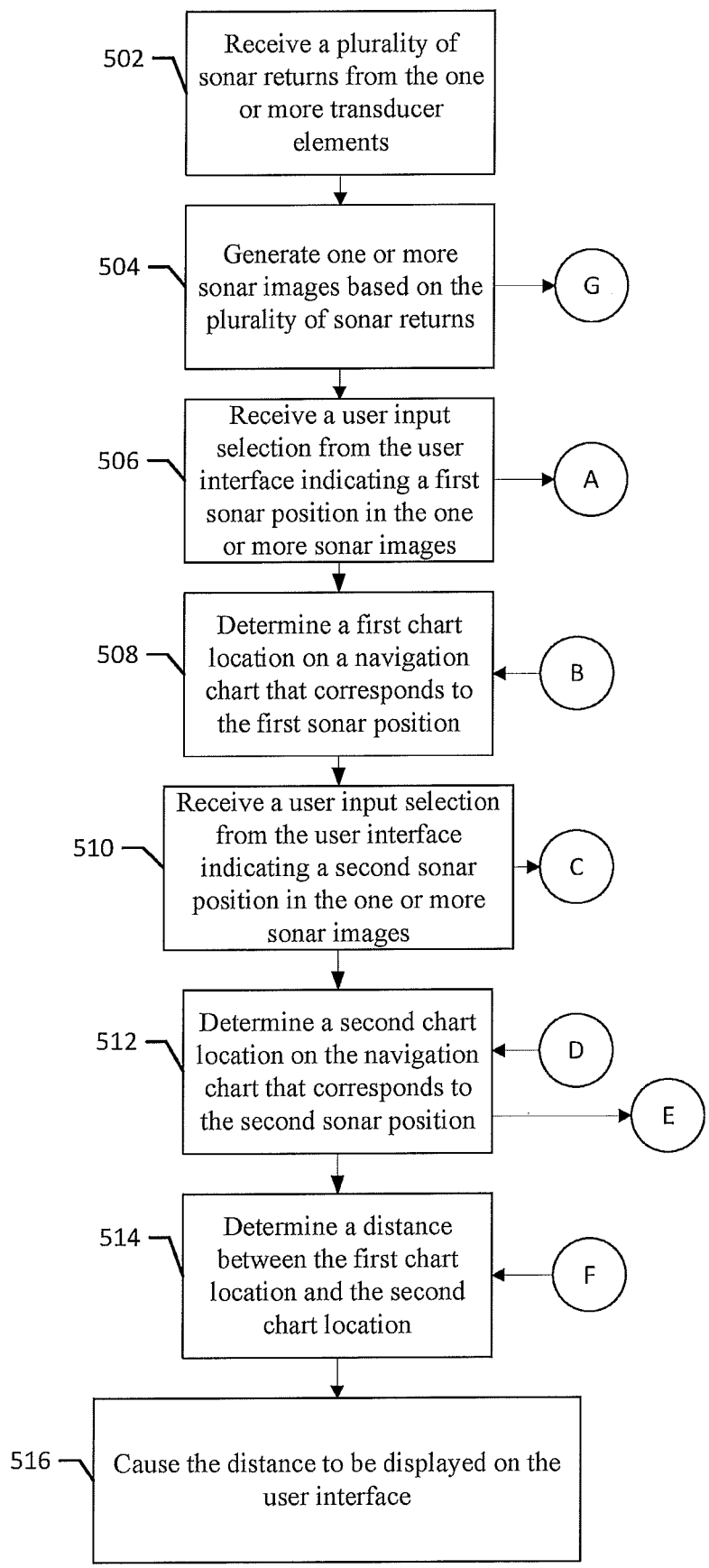
Figure 7:
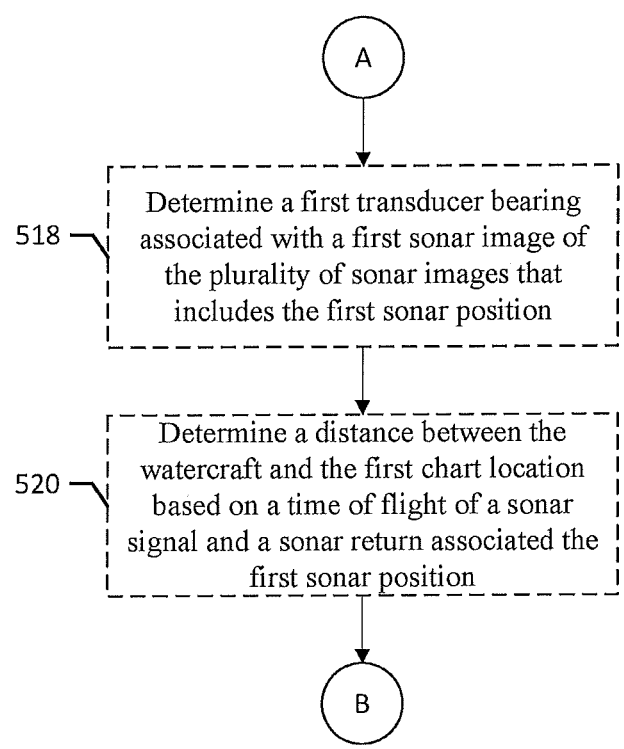
Figure 8:
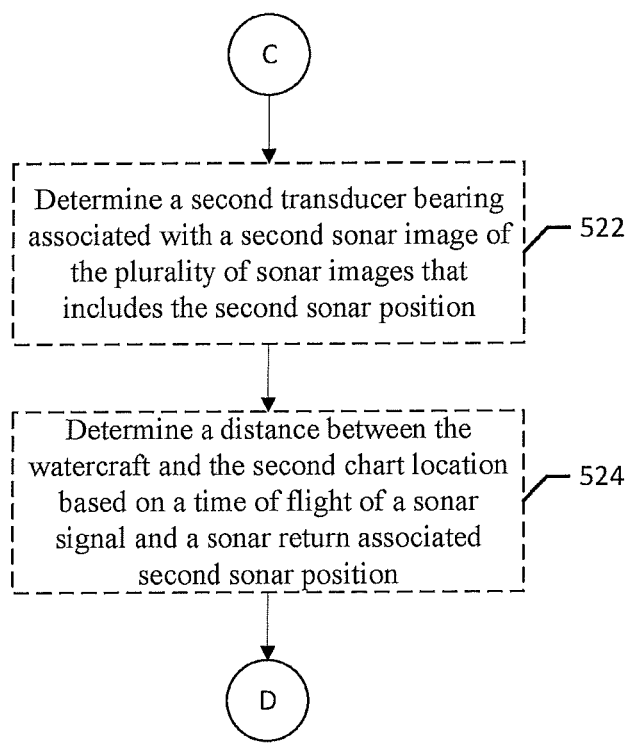
Figure 9:
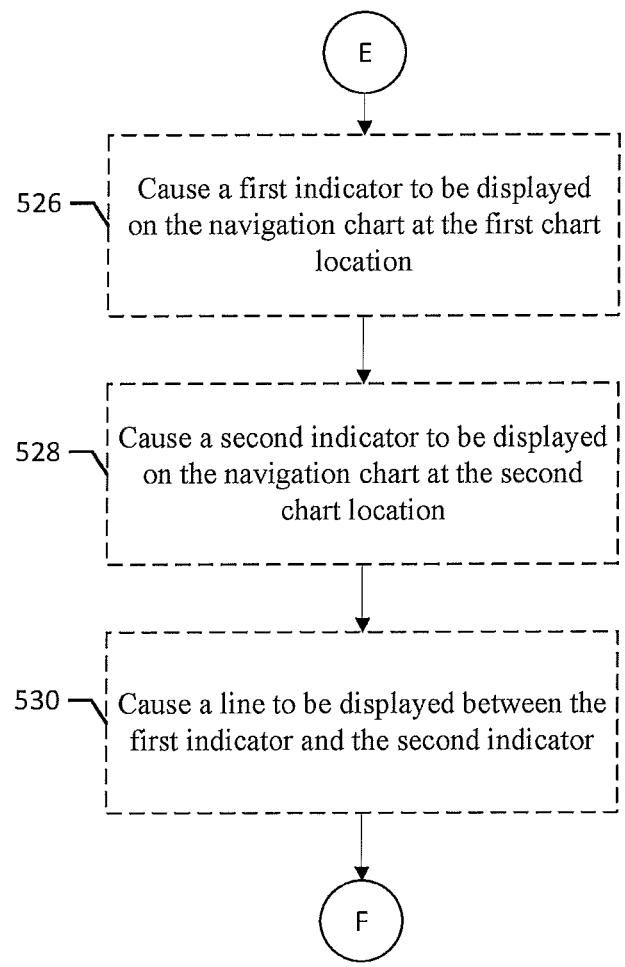
Figure 10:
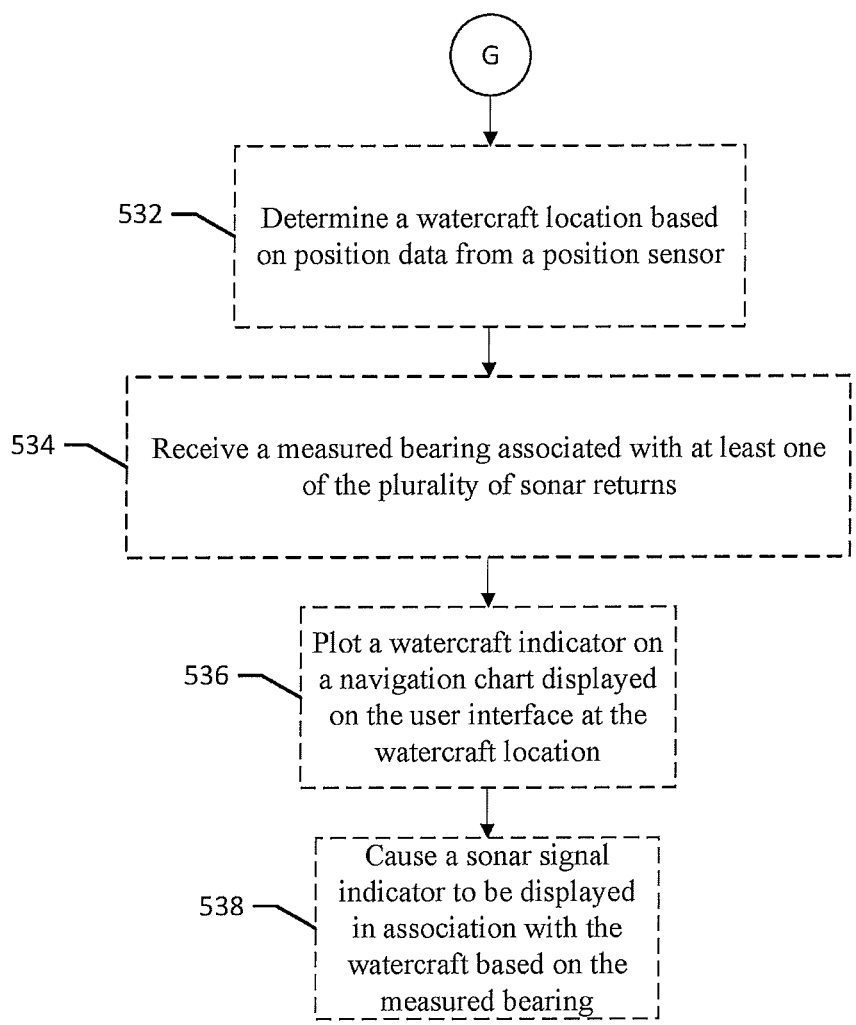

Having thus described the invention in general terms, reference will now be made to the accompanying drawings, which are not necessarily drawn to scale, and wherein:

FIG. 1 illustrates an example watercraft including various sonar transducer assemblies, in accordance with some embodiments discussed herein;

FIGS. 2A-2C illustrate example user interface displays including a sonar image and a navigation chart, in accordance with some embodiments discussed herein;

FIG. 3 illustrates an example distance calculation, in accordance with some embodiments discussed herein;

FIG. 4 illustrates an example sonar signal indicator, in accordance with some example embodiments;

FIG. 5 shows a block diagram illustrating an example marine system, in accordance with some embodiments discussed herein; and FIGS. 6-10 illustrate flowcharts of example methods of determining a distance in a sonar image, in accordance with some embodiments discussed herein.

DETAILED DESCRIPTION

Exemplary embodiments of the present invention now will be described more fully hereinafter with reference to the accompanying drawings, in which some, but not all embodiments of the invention, are shown. Indeed, the invention may be embodied in many different forms and should not be construed as limited to the exemplary embodiments set forth herein; rather, these embodiments are provided so that this disclosure will satisfy applicable legal requirements. Like reference numerals refer to like elements throughout.

As depicted in FIG. 1, a watercraft, e.g. vessel 100, configured to traverse a marine environment, e.g. body of water 101, may use one or more sonar transducer assemblies 102 disposed on and/or proximate to the vessel. For example the depicted transducer assemblies are shown as being transom mounted, through-hull mounted, and mounted to a trolling motor, though other mountings are contemplated. The transducer assemblies 102 may each include one or more transducer elements configured to transmit sonar signals 114, e.g. sound waves, into a body of water, receive sonar return signals, e.g. sonar returns 118, from the body of water 101, and convert the sonar returns into sonar return data. The vessel 100 may be a surface watercraft, a submersible watercraft, or any other implementation known to those skilled in the art.

One or more sonar signals 110 may be generated by the one or more transducer assemblies 102 when deployed in the body of water 101. In some instances, a plurality of transducer elements may be embodied in a transducer assembly. In some instances, the transducer assembly may include one or more of a right scanning (e.g., sidescan) element, a left scanning (e.g., sidescan) element, a conical downscan sonar element, and/or a bar (e.g., linear, elongated rectangle, or the like) downscan sonar element, which may be housed within a transducer housing. In some example embodiments, the transducer assembly may be a transducer array, e.g. a "phased array."

The transducers may transmit one or more sonar signals 110, e.g. sonar beams, into a body of water 101 with an emitting transducer, an emit/receive transducer, or similar device. When the sound waves, of the sonar beams, strike anything of differing acoustic impedance (e.g., the sea floor or something suspended in the water above the bottom), the sound waves reflect off that object 112. These echoes (or sonar returns 114) may strike the emitting transducer element and/or a separate one or more sonar receiver elements, which convert the echoes back into an electrical signal which is processed by a processor (e.g., processing circuitry 407, as discussed in reference to FIG. 5) and sent to a display 120 (e.g., an LCD) mounted in the cabin or other convenient location in the watercraft. This process is often called "sounding". Since the speed of sound in water may be determined by the properties of the water (approximately 4800 feet per second in fresh water), the time lapse between the transmitted signal and the received echoes can be measured and the distance to the objects determined. This process may repeat itself many times per second. The results of many soundings are used to build a picture on the display of the underwater environment, e.g. a sonar image.

In an example embodiment, the one or more transducers assemblies 102 may include multiple transducer arrays and/or transducer elements cooperating to receive sonar returns 114 from the underwater environment. The transducer arrays and/or transducer elements may be arranged in a predetermined configuration, e.g. relative positions, including known distances between each transducer array or transducer element. The relative positions and known distances between the transducer arrays and/or transducer elements may be used to resolve an angle associated with the sonar returns 114 (and, for example, a corresponding object in the underwater environment) and the surface of the body of water. The respective angles determined by the relative positions and known distances of the transducer arrays or transducer elements may be compared and combined to generate a two-dimensional and/or a three-dimensional position of the sonar returns 114 (and, for example, a corresponding representation of an object 112 in the underwater environment 101).

In some example embodiments, the returns from a plurality of the transducer arrays and/or transducer elements may be compared via the process of interferometry to generate one or more angle values. Interferometry may involve determining the angle to a given sonar return signal via a phase difference between the returns received at two or more transducer arrays and/or transducer elements. In some embodiments, the process of beamforming may be used in conjunction with the plurality of transducer arrays and/or transducer elements to generate one or more angle values associated with each sonar return signal. Beamforming may involve generating a plurality of receive beams at predetermined angles by spatially defining the beams based on the relative phasing of the sonar returns and detecting the distance of the sonar returns in each respective beam. Beamforming and interferometry are further described in U.S. patent application Ser. No. 14/717,458, entitled "Sonar Systems using Interferometry and/or Beamforming for 3D Imaging", published as US 2016/0341827, and U.S. Pat. No. 9,739,884, entitled "Systems and Associated Methods for Producing a 3D Sonar Image," both of which are assigned to the Assignee/Applicant of the present application and are hereby incorporated by reference herein in their entireties.

In an example embodiment, a vessel 100 may include a main propulsion motor 106, such as an outboard or inboard motor. Additionally, the vessel 100 may include a trolling motor 108 (or other secondary propulsion system) configured to propel the vessel 100 or maintain a position. The one or more transducer assemblies 102 may be mounted in various positions and to various portions of the vessel 100 and/or equipment associated with the vessel 100. For example, the transducer assemblies may be mounted to the transom of the vessel 100, may be mounted to the bottom or side of the hull of the vessel 100, or may be mounted to the trolling motor 108 (such as depicted in FIG. 1). In an example embodiment, the transducer assembly 102 may be steerable. For example, the transducer assembly 102 may include a steering assembly configured to steer the transducer assembly 102 in a plurality of directions. In an example embodiment, the transducer assembly 102 may be mounted to the trolling motor 108, and the sonar transducer may be steered by operation of a steering assembly associated with trolling motor 108.

FIGS. 2A-2C illustrate example user interface displays 200 including a sonar image 202 and a navigation chart 204. A marine electronics device, such as marine electronics device 405 described below in reference to FIG. 5, may determine a vessel location based on position data from a position sensor, such as a GPS sensor. The marine electronics device 405 may plot a vessel location indicator 207 on the navigation chart 204. In some example embodiments, the vessel location indicator 207 may also include an indication of the orientation of the vessel, such as the plot may be an elongated triangular shape with a point indicating the front of the vessel. The marine electronics device 405 may receive orientation data from a manometer, a gyroscope, an accelerometer, or other sensor. As such, in some embodiments, the marine electronics device 405 may orient the vessel location indicator 207 to correspond with the orientation of the vessel 100 on the body of water.

As depicted in FIG. 2A, in some example embodiments, a user may select a first sonar position in the sonar image 202, such as by touching a touch screen user interface or moving a cursor 206 on the user interface display 200. The marine electronics device 405 may determine a first chart location 208 on the navigation chart 204 corresponding to the first sonar position. The marine electronics device 405 may receive sonar return data, as discussed above. The sonar return data may include, or be associated with, a transducer bearing indicating the direction that an emitting face of the transducer assembly 102 was facing when the sonar return data was collected. The transducer bearing may be measured (e.g., by magnetometer, a gyroscope, and/or an accelerometer) or may be determined by a positon of the steering assembly relative a reference position. In some example embodiments, the transducer assembly 102 may include one or more position sensors, such as GPS sensors or RFID tags. The transducer bearing may be measured based on movement of the one or more position sensors or a difference between the position sensors and a reference position sensor. In some example embodiments, the transducer bearing may also include a compensation for a sonar signal or beam direction relative to the emitting face direction and/or the offset of the selected location from the center of the sonar image 202.

The marine electronics device 405 may determine a distance from the vessel for the selected first sonar position in the sonar image 202, such as based on the sonar return data. For example the marine electronics device 405 may determine the distance between the vessel 100 and the first sonar position based on the time of flight corresponding to the sonar signal and the sonar return. In some embodiments, the angle of the sonar return with respect to the surface of the body of water can be determined and used to determine a corresponding horizontal distance to the sonar return. For example, the marine electronic device 405 may determine the distance based on the time of flight of the sonar signal and the sonar return and an angle of the first sonar position relative to the surface of the body of water. The marine electronics device 405 may then determine the horizontal distance, e.g. parallel to the surface of the water, such as using trigonometry equations or other known methods. The marine electronics device 405 may then plot the first chart location 208 on the navigation chart 204 at the determined distance (e.g., the horizontal distance) in the first transducer bearing relative to the vessel location. In some instances, a distance 212 may be displayed for the first chart location relative to the vessel.

In some example embodiments, a user may select a second sonar position in the same sonar image 202, such as using a cursor 206 as shown in FIG. 2B. The marine electronics device 405 may determine a second chart location 210 on the navigation chart 204 corresponding to the second sonar position. The determination of the second chart location 210 may be substantially similar to the determination of the first chart location 208, as discussed above. The marine electronics device 405 may plot the second chart location 210 on the navigation chart 204. In an example embodiment, the distance from the vessel to the second chart location 210 may also be displayed with the distance 212 to the first chart position 208.

Additionally or alternatively, the user may select a second sonar position in a second sonar image 202', such as using cursor 206 as shown in FIG. 2C. For example, the user may rotate the sonar transducer and/or trolling motor to a different direction or transducer bearing (or the transducer may automatically rotate, such as through beam forming, mechanical systems, or otherwise) and receive sonar returns for a different area of the underwater environment, which are, in turn, used to generate the second sonar image 202'.

The marine electronics device 405 may determine the second chart location 210' in substantially the same manner as the determination of the first chart location 208, as discussed above, using the second transducer bearing.

In an example embodiment, the marine electronics device 405 may determine the distance between the first sonar position and the second sonar position. In an example embodiment, the marine electronic device 405 may measure the distance between the plotted first chart location 208 and the plotted second chart location 210 to determine the distance between the first sonar position and the second sonar position. Additionally or alternatively, the marine electronics device 405 may determine the distance between the first sonar position and the second sonar position based on their associated distances from the vessel and transducer bearings.

FIG. 3 illustrates an example distance determination, or calculation. The marine electronic device 405 may assume that the vessel location 307 is relatively stationary relative to both a first sonar position 308 and a second sonar position 310. The stable, e.g. stationary, vessel location 307 creates a triangle between the first sonar position 307, the second sonar position 310, and the vessel location 307. The marine electronics device 405 may first determine an angle θ between a first transducer bearing 314A and a second transducer bearing 314B. In the depicted example, the angle θ is 90 degrees, the distance to the first sonar position 308 is 26 ft., and the distance to the second sonar position 310 is 34 ft. The marine electronics device 405 may calculate the distance 316 between a first sonar position 308 and a second sonar position 310 using trigonometry equations. In the depicted example, the distance 316 between the first sonar position 308 and the second sonar position 310 is ~42.8 ft. The above example calculation is provided as just one example calculation that can be used to determine the distance between the two selected sonar positions/chart locations, as others are contemplated for use with embodiments of the present invention.

Returning to FIGS. 2B and 2C, the marine electronics device 405 may plot a line between the first chart location 208 and the second chart location 210 indicating the distance being measured. Additionally or alternatively, the marine electronics device 405 may display the distance on the line, in a popup text box, or other suitable location of the user interface display 200.

In some example embodiments, the determination of a distance between the first sonar position and the second sonar position may be performed dynamically, such as while the user moves the cursor 206 about the sonar image 202 after selecting the first sonar position in the sonar image 202. In such an embodiment, receiving the user input selection from the user interface indicating the second sonar position in the sonar image 202, determining the second chart location 210 determining the distance between the first chart location 208 and the second chart location 210, and/or causing the distance to be displayed on the user interface may be performed repeatedly in real time.

In some example embodiments, the marine electronics device 405 may determine and display the direction of the one or more sonar signals 110 transmitted into the body of water relative to the vessel 100. The marine electronics device 405 may determine a vessel location/orientation based on position data from the position sensor and plot the vessel location indicator 207 on a navigation chart 204, as discussed above. The marine electronics device 405 may also receive a transducer bearing as a portion of, or in association with, the sonar return data. The marine electronics device 405 may cause a sonar signal/beam indicator 330 to be displayed relative to the vessel indicator 207, such that the sonar signal indicator 330 indicates the direction and/or shape of the sonar signals 110 transmitted into the underwater environment based on the transducer bearing. In some example embodiments, a sonar signal/beam indicator 330' may also be overlaid on the sonar image 202 to indicate the direction of the sonar signals relative to the vessel 100.

FIG. 4 illustrates an example sonar signal/beam indicator 330, in accordance with some example embodiments. The sonar signal indicator 330 may be positioned relative to a vessel indicator 307 or the vessel location indicator 207. The sonar signal indicator 330 may include an arc 332 including a width W and a length L. In an example embodiment, the width W and length L of the arc 332 may be indicative of the effective width and effective range of the sonar signals 110 (e.g., the −3 dB range, or other range). The marine electronics device 405 may be configured to determine the effective range or effective distance of the sonar signals 110, such as based on operating frequency of the transducer assembly 102. In an example embodiment, the marine electronics device 405 may include a lookup table, such as stored in memory. The marine electronics device 405 may access the lookup table to determine the effective range of the sonar signal based on the current operating frequency of the transducer assembly 102. The marine electronics device 405 may then adjust the length L and/or width W of the sonar signal indicator 330 based on the determined effective distance, or range, of the sonar signals.

Example System Architecture

FIG. 5 shows a block diagram of an example marine system 400 capable for use with several embodiments of the present invention. As shown, the marine system 400 may include a number of different modules or components, each of which may comprise any device or means embodied in either hardware, software, or a combination of hardware and software configured to perform one or more corresponding functions. For example, the marine system 400 may include a marine electronics device 405.

The marine system 400 may also include one or more communications modules configured to communicate with one another in any of a number of different manners including, for example, via a network. In this regard, the communications module may include any of a number of different communication backbones or frameworks including, for example, Ethernet, the NMEA 2000 framework, GPS, cellular, WiFi, or other suitable networks. The network may also support other data sources, including GPS, autopilot, engine data, compass, radar, etc. Numerous other peripheral devices such as one or more wired or wireless multi-function displays (e.g. a marine electronics device 405) may be included in the marine system 400.

The marine electronics device 405 may include a processor 410, a memory 420, a user interface 435, a display 440, one or more sensors (e.g. position sensor 445, gyroscope 451, an accelerometer 452, magnetometer 453, etc.), and a communication interface 430.

The processor 410 and memory 420 may form processing circuitry 407. The processor 410 may be any means configured to execute various programmed operations or instructions stored in a memory device such as a device or circuitry operating in accordance with software or otherwise embodied in hardware or a combination of hardware and software (e.g. a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the processor 410 as described herein. In this regard, the processor 410 may be configured to analyze electrical signals communicated thereto to provide marine data for utilization in various embodiments described herein. For example, the processor 410 may be configured to receive user input associated with sonar image to determine a distance in the sonar image(s) to display to a user (e.g. on display 440/user interface 435).

In some embodiments, the processor 410 may be further configured to implement signal processing or enhancement features to improve the display characteristics or data or images, collect or process additional data, such as time, temperature, GPS information, waypoint designations, or others, or may filter extraneous data to better analyze the collected data. It may further implement notices and alarms, such as those determined or adjusted by a user, to reflect depth, presence of fish, proximity of other vehicles, e.g. watercraft, etc.

The memory 420 may be configured to store instructions, computer program code, marine data, such as sonar data, chart data, location/position data, and other data associated with the navigation system in a non-transitory computer readable medium for use, such as by the processor.

The communication interface 430 may be configured to enable connection to external systems (e.g. an external network 402). In this manner, the marine electronics device 405 may retrieve stored data from a remote, external server via the external network 402 in addition to or as an alternative to the onboard memory 420.

The position sensor 445 may be configured to determine the current position/location and/or orientation of the marine electronics device 405 (and, thus, in some embodiments the watercraft). For example, the position sensor 445 may comprise a GPS, bottom contour, inertial navigation system, such as micro electro-mechanical sensor (MEMS), a ring laser gyroscope, or the like, or other location detection system.

The display 440 may be configured to display images and may include or otherwise be in communication with a user interface 435 configured to receive an input from a user. The display 440 may be, for example, a conventional LCD (liquid crystal display), a touch screen display, mobile device, or any other suitable display known in the art upon which images may be displayed.

In any of the embodiments, the display 440 may present one or more sets of marine data (or images generated from the one or more sets of data). Such marine data includes chart data, radar data, weather data, location data, position data, orientation data, sonar data, or any other type of information relevant to the watercraft. In some embodiments, the display 440 may be configured to present such marine data simultaneously as one or more layers or in split-screen mode. In some embodiments, a user may select any of the possible combinations of the marine data for display.

In some further embodiments, various sets of data, referred to above, may be superimposed or overlaid onto one another. For example, a route may be applied to (or overlaid onto) a chart (e.g. a map or navigation chart). Additionally or alternatively, depth information, weather information, radar information, sonar information, or any other navigation system inputs may be applied to one another.

The user interface 435 may include, for example, a keyboard, keypad, function keys, mouse, scrolling device, input/output ports, touch screen, or any other mechanism by which a user may interface with the system.

Although the display 440 of FIG. 5 is shown as being directly connected to the processor 410 and within the marine electronics device 405, the display 440 could alternatively be remote from the processor 410 and/or marine electronics device 405. Likewise, in some embodiments, the position sensor 445 and/or user interface 135 could be remote from the marine electronics device 405.

The marine electronics device 405 may include one or more other sensors 447. In some embodiments, the other sensors 447 may be condition parameter sensors configured to measure environmental condition parameters. The condition parameter sensors may include, for example, an air temperature sensor, a water temperature sensor, a current sensor, a light sensor, a wind sensor, a speed sensor, or the like. The environmental parameters may be associated with collected sonar data and/or user input, such as fishing logs, e.g. fishing data.

The sonar transducer 448 (e.g., transducer assembly 102) may be housed in a trolling motor housing, attached to the watercraft or trolling motor, or, in some cases, be castable. The sonar transducer 448 may be configured to gather sonar data, e.g. sonar returns, from the underwater environment relative to the watercraft. Accordingly, the processor 410 may be configured to receive the sonar returns from the sonar transducer 448, process the sonar returns to generate an image including a sonar image based on the gathered sonar returns. In some embodiments, the marine electronics device 405 may be used to determine depth and bottom contours, detect fish, locate wreckage, etc. Sonar signals, e.g. beams or pulses, from a sonar transducer 448, can be transmitted into the underwater environment. The sonar signals reflect off objects in the underwater environment (e.g. fish, structure, sea floor bottom, etc.) and return to the transducer assembly, which converts the active sonar returns into sonar data that can be used to produce an image of the underwater environment.

In an example embodiment, the vessel 100, the transducer assembly 102 and/or the marine electronics device 405 may include a gyroscope 451, an accelerometer 452, and/or a magnetometer 453. FIG. 5 shows such components separate from the transducer assembly 102 (e.g., the sonar transducer 448) and the marine electronics device 405, however, in some embodiments, such components may only be present in one of the transducer assembly 102 or marine electronics device 405, or present in both. The gyroscope 451, the accelerometer 452, and/or the magnetometer 453 may be portions of a micro electro-mechanical system (MEMS) 450. The gyroscope 451 may be configured to measure an angular velocity of the gyroscope 451. In some example embodiments, the gyroscope 451 may be a vibrating structure MEMS gyroscope including gyroscopic sensors oriented in a plurality of axes. The accelerometer 452 may be configured to measure acceleration of the accelerometer. In some example embodiments, the accelerometer may be a variable capacitive (VC) MEMS accelerometer, a piezoresistive (PR) MEMS accelerometer, or the like. The magnetometer 453 may be configured to measure a magnetic field strength, which may be used to find magnetic north and/or a heading angle. In an example embodiment, the magnetometer may be a Lorentz force based MEMS sensor, electron tunneling MEMS sensor, MEMS compass, or the like.

Example Flowchart(s) and Operations

Embodiments of the present invention provide methods, apparatus and computer program products for determining a distance in a sonar image. Various examples of the operations performed in accordance with embodiments of the present invention will now be provided with reference to FIGS. 6-10.

FIGS. 6-10 illustrate flowcharts according to an example method for determining distance in a sonar image and/or displaying a sonar signal indicator in a sonar image according to various example embodiments described herein. The operations illustrated in and described with respect to FIGS. 6-10 may, for example, be performed by, with the assistance of, and/or under the control of the marine electronics device 405 including processing circuitry 407, the processor 410, memory 420, communication interface 430, user interface 435, position sensor 445, other sensors 447, sonar transducer 448, gyroscope 451, accelerometer 452, and/or magnetometer 453.

The method of determining a distance in a sonar image depicted in FIGS. 6-10 may include receiving a plurality of sonar returns from the one or more transducer elements at operation 502, generating one or more sonar images based on the plurality of sonar returns at operation 504, receiving a user input selection from the user interface indicating a first sonar position in the one or more sonar images at operation 506, and determining a first chart location on a navigation chart that corresponds to the first sonar position at operation 508. The method may also include receiving a user input selection from the user interface indicating a second sonar position in the one or more sonar images at operation 510, determining a second chart location on the navigation chart that corresponds to the second sonar position at operation 512, determining a distance between the first chart location and the second chart location at operation 514, and causing the distance to be displayed on the user interface at operation 516.

In some embodiments, the method of determining a distance in a sonar image may include additional, optional operations, and/or the operations described above may be modified or augmented. Some examples of modifications, optional operations, and augmentations are described below, as indicated by dashed lines, such as determining a first transducer bearing associated with a first sonar image of the plurality of sonar images that includes the first sonar position at operation 518, and determining a distance between the watercraft and the first chart location based on a time of flight of a sonar signal and a sonar return associated the first sonar position at operation 520. In an example embodiment, the method may also include determining a second transducer bearing associated with a second sonar image of the plurality of sonar images that includes the second sonar position at operation 522 and determining a distance between the watercraft and the second chart location based on a time of flight of a sonar signal and a sonar return associated second sonar position at operation 524. In an example embodiment, the method may additionally include causing a first indicator to be displayed on the navigation chart at the first chart location at operation 526, causing a second indicator to be displayed on the navigation chart at the second chart location at operation 528, and causing a line to be displayed between the first indicator and the second indicator at operation 530. In some example embodiments, the method may optionally include determining a watercraft location based on position data from a position sensor at operation 532, receiving a measured bearing associated with at least one of the plurality of sonar returns or sonar emission pulses at operation 534, plotting a watercraft indicator on a navigation chart displayed on the user interface at the watercraft location at operation 536, and causing a sonar signal indicator to be displayed in association with the watercraft based on the measured bearing at operation 538.

FIGS. 6-10 illustrate flowcharts of a system, method, and computer program product according to some example embodiments. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by, for example, the memory 420 and executed by, for example, the processing circuitry 407. As will be appreciated, any such computer program product may be loaded onto a computer or other programmable apparatus (for example, a marine electronics device 405) to produce a machine, such that the computer program product including the instructions which execute on the computer or other programmable apparatus creates means for implementing the functions specified in the flowchart block(s). Further, the computer program product may comprise one or more non-transitory computer-readable mediums on which the computer program instructions may be stored such that the one or more computer-readable memories can direct a computer or other programmable device (for example a marine electronics device 405) to cause a series of operations to be performed on the computer or other programmable apparatus to produce a computer-implemented process such that the instructions which execute on the computer or other programmable apparatus implement the functions specified in the flowchart block(s).

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

That which is claimed:

1. A system for displaying a marine chart, the system comprising:
   one or more transducer elements mountable to a watercraft and configured to transmit sonar signals into an underwater environment of a body of water and receive corresponding sonar returns from the underwater environment, wherein a direction that the one or more transducer elements are facing relative to the watercraft is variable;

a bearing sensor configured to measure a bearing associated with the direction that the one or more transducer elements are facing during receipt of the sonar returns; and a marine electronics device comprising:
  a user interface;
  a processor, and
  a memory including computer program code configured to, with the processor, cause the marine electronics device to:
    receive sonar return data from the one or more transducer elements;
    generate one or more sonar images based on the sonar return data, wherein the one or more sonar images comprise a real time image of the underwater environment of the body of water, wherein the one or more sonar images are generated such that sonar imagery is presented in a fixed orientation on the display regardless of the direction that the one or more transducer elements are facing relative to the watercraft;
    cause the one or more sonar images to be presented on a display;
    determine a watercraft location based on position data from a position sensor;
    receive a measured bearing from the bearing sensor associated with the sonar return data;
    cause a navigation chart to be presented on the display separately from the one or more sonar images;
    cause a watercraft indicator to be presented at a watercraft location on the navigation chart presented on the display; and
    cause a sonar beam indicator to be presented on the navigation chart in association with the watercraft indicator based on the measured bearing, wherein the sonar beam indicator displays an indication of the direction that the one or more transducer elements are facing relative to the watercraft when the sonar return data was received by the one or more transducer elements.

2. The system of claim 1, wherein the sonar beam indicator comprises an icon corresponding to a sonar beam, wherein the icon includes an arc that corresponds to an effective horizontal beam coverage of the one or more transducer elements.

3. The system of claim 2, wherein the computer program code is further configured to cause the processor to:
  determine an effective distance of the sonar signals emitted from the one or more transducer elements based on an operating frequency of the one or more transducer elements; and
  adjust a length of the sonar beam indicator extending from the watercraft indicator based on the determined effective distance of the sonar signals.

4. The system of claim 1, wherein the watercraft indicator indicates an orientation of the watercraft relative to the navigation chart.

5. The system of claim 1, wherein the computer program code is further configured to cause the processor to:
  cause a second sonar beam indicator to be displayed overlaid on the one or more sonar images.

6. The system of claim 5, wherein the second sonar beam indicator is displayed in association with a watercraft orientation reference based on the measured bearing, wherein the second sonar beam indicator displays the direction of the sonar signals transmitted into the body of water relative to the watercraft.

7. The system of claim 1, wherein the one or more sonar images are presented on a first portion of the display and the navigation chart is presented on a second portion of the display.

8. The system of claim 1 further comprising:
  a steering assembly configured to steer the one or more transducer elements in a plurality of directions.

9. The system of claim 1 further comprising:
  a trolling motor comprising:
    a motor housing that comprises a motor configured to cause the trolling motor to propel the watercraft when the trolling motor is attached to the watercraft and the motor is submerged,
  wherein the one or more transducer elements are mounted to the trolling motor.

10. The system of claim 9, wherein the trolling motor further comprises:
  a steering assembly configured to steer the trolling motor in a plurality of directions.

11. A system comprising:
  one or more transducer elements mountable to a watercraft and configured to transmit sonar signals into an underwater environment of a body of water and receive corresponding sonar returns from the underwater environment, wherein the one or more transducer elements are configured to convert the sonar returns to sonar return data, wherein a direction that the one or more transducer elements are facing relative to the watercraft is variable; and
  a bearing sensor configured to measure a bearing associated with the direction that the one or more transducer elements are facing during receipt of the sonar returns; and
  a marine electronics device comprising:
    a user interface;
    a processor, and
    a memory including computer program code configured to, with the processor, cause the marine electronics device to:
      receive the sonar return data from the one or more transducer elements;
      generate one or more sonar images based on the sonar return data, wherein the one or more sonar images comprise a real time image of the underwater environment of the body of water, wherein the one or more sonar images are generated such that sonar imagery is presented in a fixed orientation on the display regardless of the direction that the one or more transducer elements are facing relative to the watercraft;
      cause the one or more sonar images to be presented on a display;
      receive a measured bearing from the bearing sensor associated with the sonar return data; and
      cause a sonar beam indicator to be presented on the display within the one or more sonar images in association with a watercraft orientation reference based on the measured bearing, wherein the sonar beam indicator displays an indication of the direction that the one or more transducer elements are facing relative to the watercraft when the sonar returns are received.

12. The system of claim 11, wherein the computer program code is further configured to cause the processor to: cause a second sonar beam indicator to be displayed in association with the watercraft indicator based on the measured bearing, wherein the second sonar beam indicator displays an indication of the direction in which the one or more transducer elements are facing when the sonar return data was received by the one or more transducer elements.

13. A system comprising:
a trolling motor for a watercraft, the trolling motor comprising:
  a motor housing that comprises a motor configured to cause the trolling motor to propel a watercraft when the trolling motor is attached to the watercraft and the motor is submerged; and
  one or more transducer elements configured to transmit sonar signals into an underwater environment of a body of water and receive corresponding sonar returns from the underwater environment, wherein a direction that the one or more transducer elements are facing relative to the watercraft is variable; and
a bearing sensor configured to measure a bearing associated with the direction that the one or more transducer elements are facing during receipt of the one or more sonar returns; and
a marine electronics device comprising:
  a user interface;
  a processor, and
  a memory including computer program code configured to, with the processor, cause the marine electronics device to:
    receive sonar return data from the one or more transducer elements;
    generate one or more sonar images based on the sonar return data, wherein the one or more sonar images comprise a real time image of the underwater environment of the body of water, wherein the one or more sonar images are generated such that sonar imagery is presented in a fixed orientation on the display regardless of the direction that the one or more transducer elements are facing relative to the watercraft;
    cause the one or more sonar images to be presented on a display;
    determine a watercraft location based on position data from a position sensor;
    receive a measured bearing from the bearing sensor associated with the sonar return data;
    cause a navigation chart to be presented on the display separately from the one or more sonar images;
    cause a watercraft indicator to be presented at a watercraft location on the navigation chart presented on the display; and
    cause a sonar beam indicator to be presented on the navigation chart in association with the watercraft indicator based on the measured bearing, wherein the sonar beam indicator displays an indication of the direction that the one or more transducer elements are facing relative to the watercraft when the sonar return data was received by the one or more transducer elements.

14. The system of claim 13, wherein the trolling motor further comprises:
a steering assembly configured to steer the trolling motor in a plurality of directions.

15. The system of claim 13, wherein the sonar beam indicator comprises an icon corresponding to a sonar beam, wherein the icon comprises an arc that corresponds to an effective horizontal beam coverage of the one or more transducer elements.

16. The system of claim 15, wherein the computer program code is further configured to cause the processor to:
determine an effective distance of the sonar signals emitted from the one or more transducer elements based on an operating frequency of the one or more transducer elements; and
adjust a length of the sonar beam indicator extending from the watercraft indicator based on the determined effective distance of the sonar signals.

17. The system of claim 13, wherein the watercraft indicator indicates an orientation of the watercraft relative to the navigation chart.

18. The system of claim 13, wherein the computer program code is further configured to cause the processor to:
cause a second sonar beam indicator to be displayed overlaid on the one or more sonar images.

19. The system of claim 18, wherein the second sonar beam indicator is displayed in association with a watercraft orientation reference based on the measured bearing, wherein the second sonar beam indicator indicates the direction of the sonar signals transmitted into the body of water relative to the watercraft.

20. The system of claim 13, wherein the one or more sonar images are presented in a first portion of the display and the navigation chart is presented in a second portion of the display.

* * * * *

UNITED STATES PATENT AND TRADEMARK OFFICE
CERTIFICATE OF CORRECTION

PATENT NO. : 11,366,222 B2  
APPLICATION NO. : 16/357710  
DATED : June 21, 2022  
INVENTOR(S) : Matthew W. Laster Page 1 of 1

It is certified that error appears in the above-identified patent and that said Letters Patent is hereby corrected as shown below:

On the Title Page

On Page 2, under item (56) References Cited, under the subheading "U.S. PATENT DOCUMENTS", after the line beginning with "9,829,321", please insert the following citation:
-- 10,114,119 B2 10/2018 Horner et al --

On Page 2, under item (56) References Cited, under the subheading "OTHER PUBLICATIONS", please delete the following citation:
"U.S. Appl. No. 10/114,119, filed Oct. 30, 2018, Horner et al."

Signed and Sealed this  
Sixteenth Day of August, 2022

Katherine Kelly Vidal  
*Director of the United States Patent and Trademark Office*